(12) United States Patent
Chen

(10) Patent No.: US 7,748,011 B2
(45) Date of Patent: Jun. 29, 2010

(54) OPTICAL DISK DRIVE HAVING NOISE REDUCTION FUNCTIONALITY

(75) Inventor: Hsin-Tso Chen, Taipei (TW)

(73) Assignee: Pegatron Corporation, Taipei (TW)

( * ) Notice: Subject to any disclaimer, the term of this patent is extended or adjusted under 35 U.S.C. 154(b) by 679 days.

(21) Appl. No.: 11/706,976

(22) Filed: Feb. 16, 2007

(65) Prior Publication Data
US 2007/0199010 A1 Aug. 23, 2007

(30) Foreign Application Priority Data
Feb. 17, 2006 (TW) .............................. 95105492 A

(51) Int. Cl.
*G11B 17/028* (2006.01)
(52) U.S. Cl. ..................................... 720/711
(58) Field of Classification Search ................. 720/711, 720/604, 714, 656, 616, 627, 707, 705; 360/99.06, 360/99.12
See application file for complete search history.

(56) References Cited

U.S. PATENT DOCUMENTS

2005/0213484 A1   9/2005   Hasegawa et al.

2007/0050785 A1 * 3/2007 Osaki ........................ 720/604
2008/0229340 A1 * 9/2008 Miyazaki ..................... 720/610

FOREIGN PATENT DOCUMENTS

| CN | 1667706 | 9/2005 |
|---|---|---|
| CN | 2724148 | 9/2005 |
| TW | 539204 | 6/2003 |
| TW | M260841 | 4/2005 |

* cited by examiner

*Primary Examiner*—Allen T Cao
(74) *Attorney, Agent, or Firm*—Muncy, Geissler, Olds, & Lowe, PLLC

(57) ABSTRACT

An optical disk drive with a noise reduction function, is used to read an optical storage media. The optical disk drive includes a turntable, a housing and a clamper. The turntable supports the optical storage media. An opening is formed on the housing. The camper is positioned on the opening, where the turntable rises upwards to connect with the clamper and lower towards a down position to separate form the camper. The clamper further comprises a base portion and a resilient arm. At least one concave section, which faces the turntable, is formed on the base portion. At least one resilient arm extends from the base and has a convex portion at the end thereof. The convex portion, which also faces the turntable, is positioned between the concave section and the turntable.

10 Claims, 4 Drawing Sheets

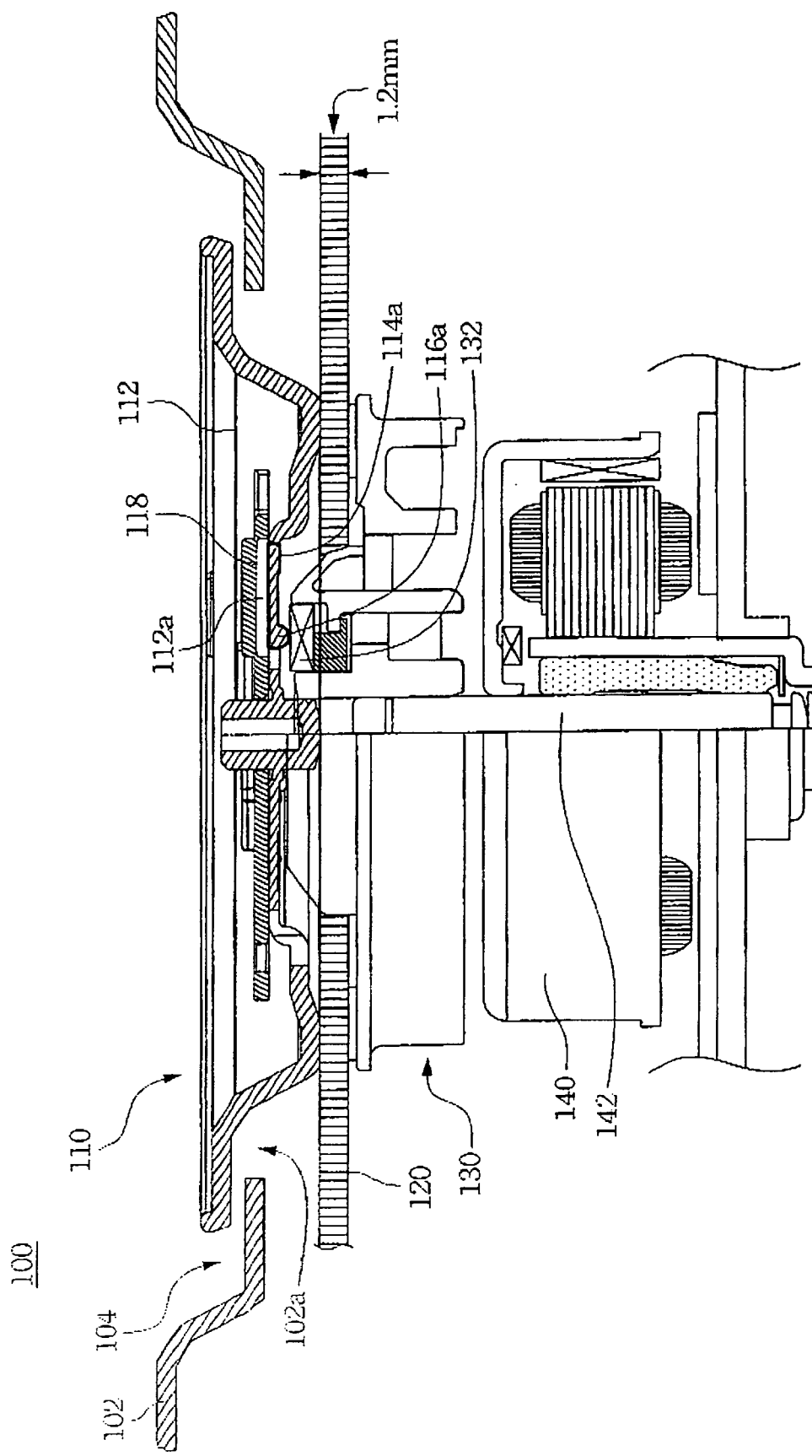

OPTICAL DISK DRIVE HAVING NOISE REDUCTION FUNCTIONALITY

RELATED APPLICATIONS

The present application is based on, and claims priority from, Taiwan Application Serial Number 95105492, filed on Feb. 17, 2006, the disclosure of which is hereby incorporated by reference herein in its entirety.

BACKGROUND

1. Field of Invention

The present invention relates to an optical disk drive. More particularly, to the present invention relates to an optical disk drive with a noise reduction function.

2. Description of Related Art

An optical disk drive is an important computer peripheral device. For example, DVD, CD-ROM or CD-R/W, are all indispensable devices for computer system and they are used to read or write an optical storage media.

A conventional optical disk drive in a desktop computer usually has a clamper for securing the optical storage media. When a turntable of a conventional optical disk drive loads the optical storage media (optical disk), the optical storage media is sandwiched and clamped between the clamper and the turntable. When the turntable is rotated by a motor, the optical storage media sandwiched between the clamper and the turntable is simultaneously rotated such that an optical pickup head can access the optical storage media.

Before a disk tray of the optical disk drive withdraws, the clamper is positioned above the turntable and not in contact with the turntable. However, when the disk tray withdraws, the turntable rises to connect with the clamper. Due to intense magnetic forces, the clamper may hit the turntable at a high speed and generate noise. Such an impact between the clamper and the turntable produces the biggest noise when no optical storage media is placed inside. For the forgoing reasons, there is a need for reducing the noise of the optical disk drive.

SUMMARY

It is therefore an objective of the present invention to provide an optical disk drive with a noise reduction function.

In accordance with the foregoing and other objectives of the present invention, an optical disk drive with a noise reduction function, is used to read an optical storage media. The optical disk drive includes a turntable, a housing and a clamper. The turntable supports the optical storage media. An opening is formed on the housing. The clamper is positioned on the opening, where the turntable rises upwards to connect with the clamper and lowered to a position to separate the turntable from the clamper. The camper further comprises a base portion and a resilient arm. At least one concave section, which faces the turntable, is formed on the base portion. At least one resilient arm extends from the base and has a convex portion at the end thereof. The convex portion, which also faces the turntable, is positioned between the concave section and the turntable.

The base portion further includes a first mutually-attracted device, and the concave section is positioned between the first mutually-attracted device and the convex portion. The turntable further includes a second mutually-attracted device. When the turntable carries the optical storage media and rises closely to the first mutually-attracted device, the optical storage media is sandwiched between the first and second mutually-attracted device by magnetic forces thereof. If the first mutually-attractive device is a magnet, the second mutually-attractive device is made from iron, cobalt, nickel or an alloy thereof. If the second mutually-attractive device is a magnet, the first mutually-attractive device is made from iron, cobalt, nickel or an alloy thereof. Otherwise, both the first and second mutually-attracted devices are magnets.

Thus, an optical disk drive of the present invention equips its clamper with resilient arms so as to buffer the impact when the magnetic forces cause the turntable to hit the clamper, thereby reducing the noise thereof.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 4 illustrates a cross-sectional view of an optical disk drive (the disk inside is 1.2 mm in thickness) according to one preferred embodiment of this invention.

DESCRIPTION OF THE PREFERRED EMBODIMENTS

Figure 1:
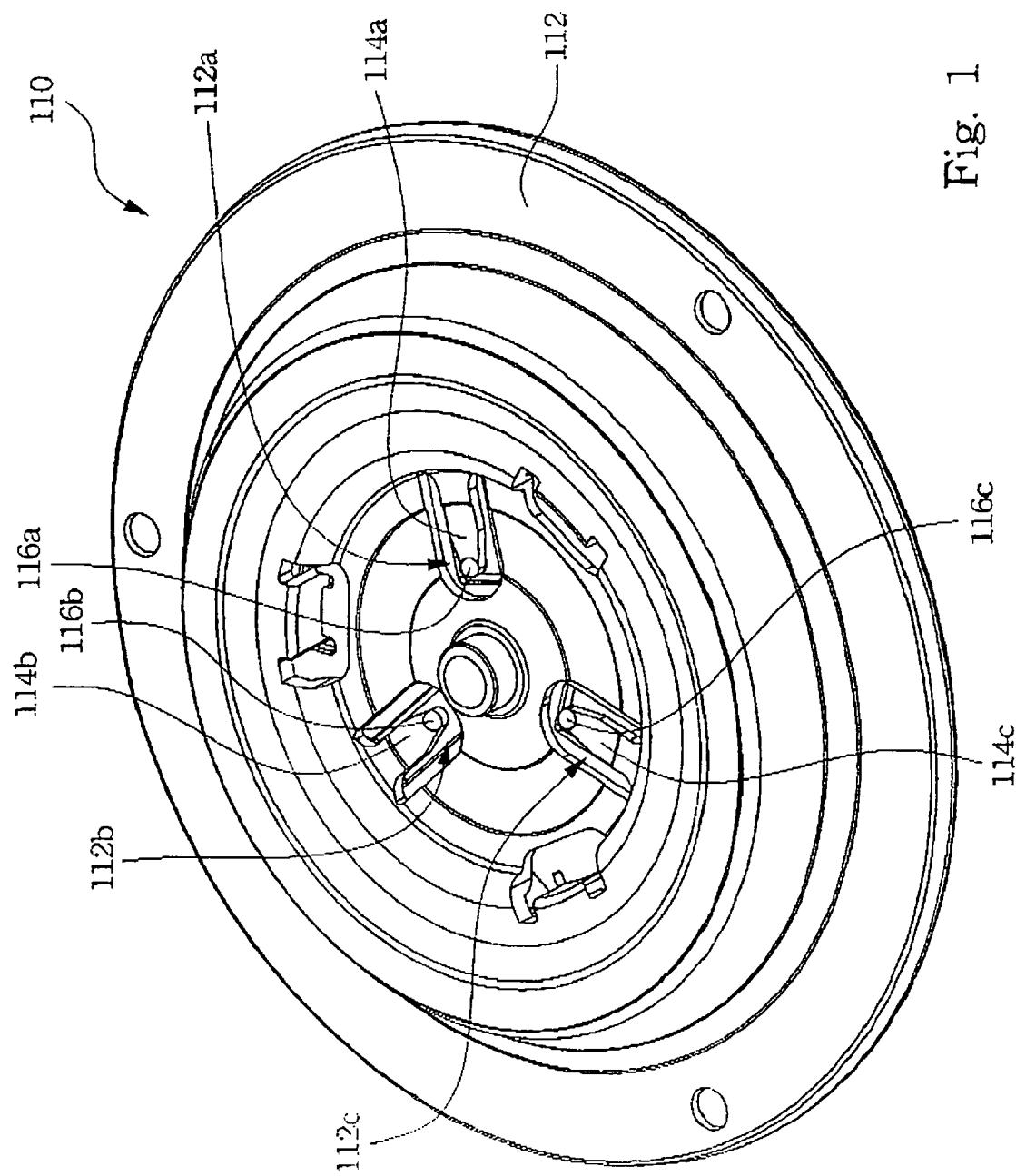
FIG. 1 illustrates a perspective view of a clamper of an optical disk drive according to one preferred embodiment of this invention.

As described above, the present invention provides an optical disk drive with a noise reduction function. The optical disk drive has a buffer structure. When the optical disk turntable hits the clamper, the buffer structure reduces the impact, thereby reducing the noise caused by the impact.

Reference will now be made in detail to the present preferred embodiments of the invention, examples of which are illustrated in the accompanying drawings. Wherever possible, the same reference numbers are used in the drawings and the description to refer to the same or like parts.

Figure 2:
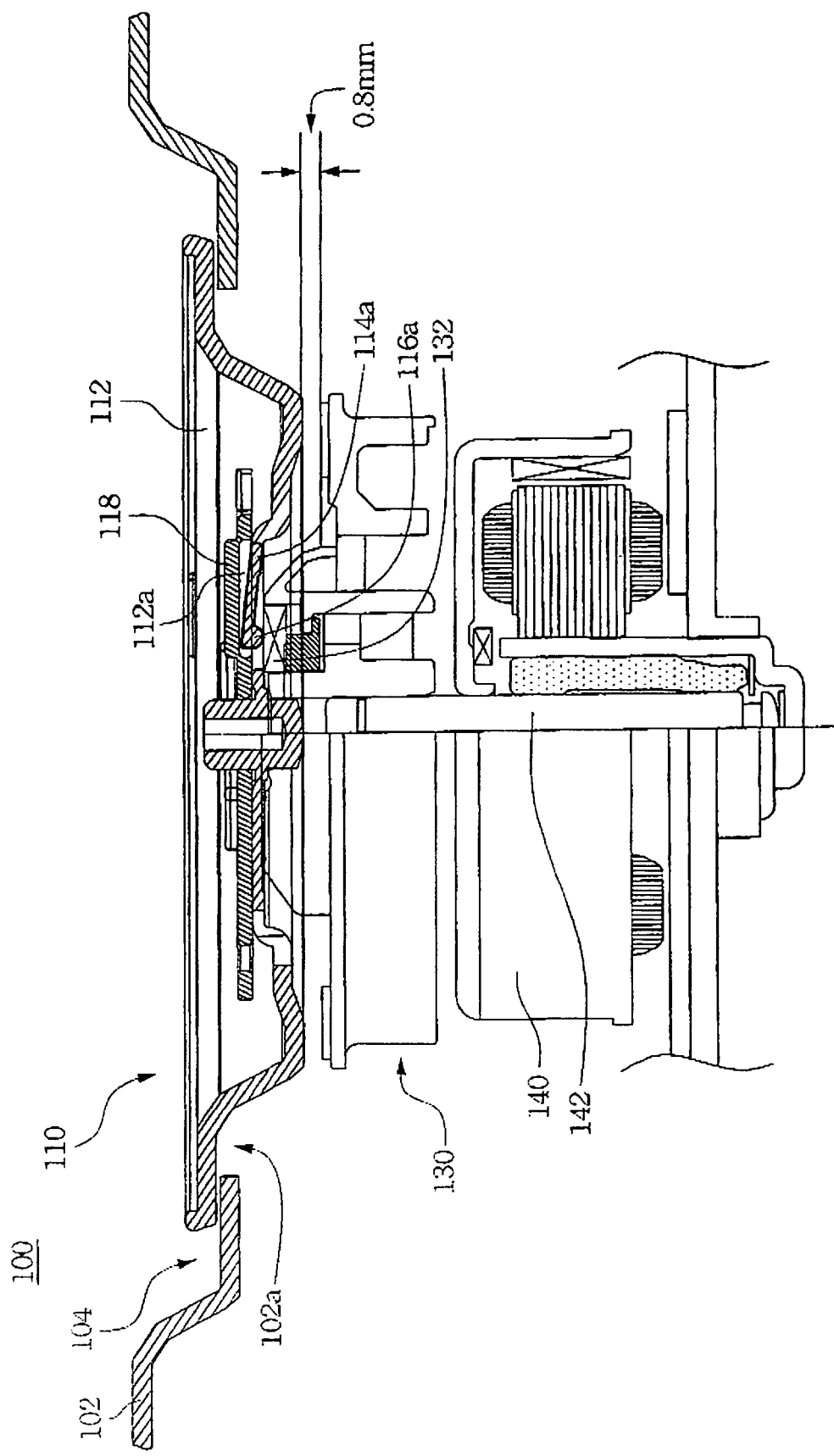
FIG. 2 illustrates a cross-sectional view of an optical disk drive (without any disk inside) according to one preferred embodiment of this invention.

Referring to FIG. 1 and FIG. 2, a clamper 110 and an optical disk drive 100 are respectively illustrated. FIG. 1 illustrates a side, which touches a turntable 130, of the clamper 110. Three resilient arms 114a/114b/114c are designed to be on the central section of clamper 110 as buffer structures. When the turntable 130 comes into contact with the three resilient arms 114a/114b/114c rapidly, the resilient arms 114a/114b/114c bend towards three concave sections 112a/112b/112c respectively. Therefore, the impact between the turntable 130 and the clamper 110 is thus absorbed by the bent resilient arms 114a/114b/114c. When the turntable 130 moves away from the three resilient arms 114a/114b/114c, the resilient arms return to their normal (original) shape.

Accordingly, three resilient arms 114a/114b/114c can be made from elastic and anti-fatigue materials such that they can endure as many impacts as possible and still have the capability to reduce noise.

In addition, three resilient arms 114a/114b/114c extend from the base portion 112, and respectively have a convex portion 116a/116b/116c atone end. The convex portions 116a/116b/116c can be semi-ball-shaped. The top points of the three convex portions 116a/116b/116c hitting the turntable 130 makes less noise than the whole surface of a conventional clamper hitting the turntable 130 does. The quantity of resilient arms can be of any amount and be still effective in reducing noise.

FIG. 2 illustrates a cross-sectional view of an optical disk drive (without any disk inside) according to one preferred embodiment of this invention. The clamper 110 is disposed in an opening 102a of the concavity 104 of the housing 102. When the turntable 130 is separate from the clamper 110 (not illustrated in drawings), an edge portion of the clamper 110 is laid against the concavity 104 around the opening 102a. When the turntable 130 is in contact with the clamper 110 (as illustrated in FIG. 2), a second mutually-attracted device 132 contacts the convex portion 116a, thereby bending the resilient arm 114a towards the concave section 112a. Therefore, the convex portion 116a is positioned between the concave section 112a and the turntable 130, and the concave section 112a is positioned between the convex portion 116a and a first mutually-attracted device 118. Because the first and second mutually-attracted devices 118 and 132 attract each other by a magnetic force, an optical storage media is sandwiched between them and clamped.

Referring to FIG. 2 again, a gap between the turntable 130 and the clamper 110 is about 0.8 mm. When the first mutually-attractive device is a magnet, the second mutually-attractive device can be made from iron, cobalt, nickel or an alloy thereof. When the second mutually-attractive device is a magnet, the first mutually-attracted device can be made from iron, cobalt, nickel or an alloy thereof. Otherwise, the first and second mutually-attracted devices 118 and 132 are both magnets.

Figure 3:
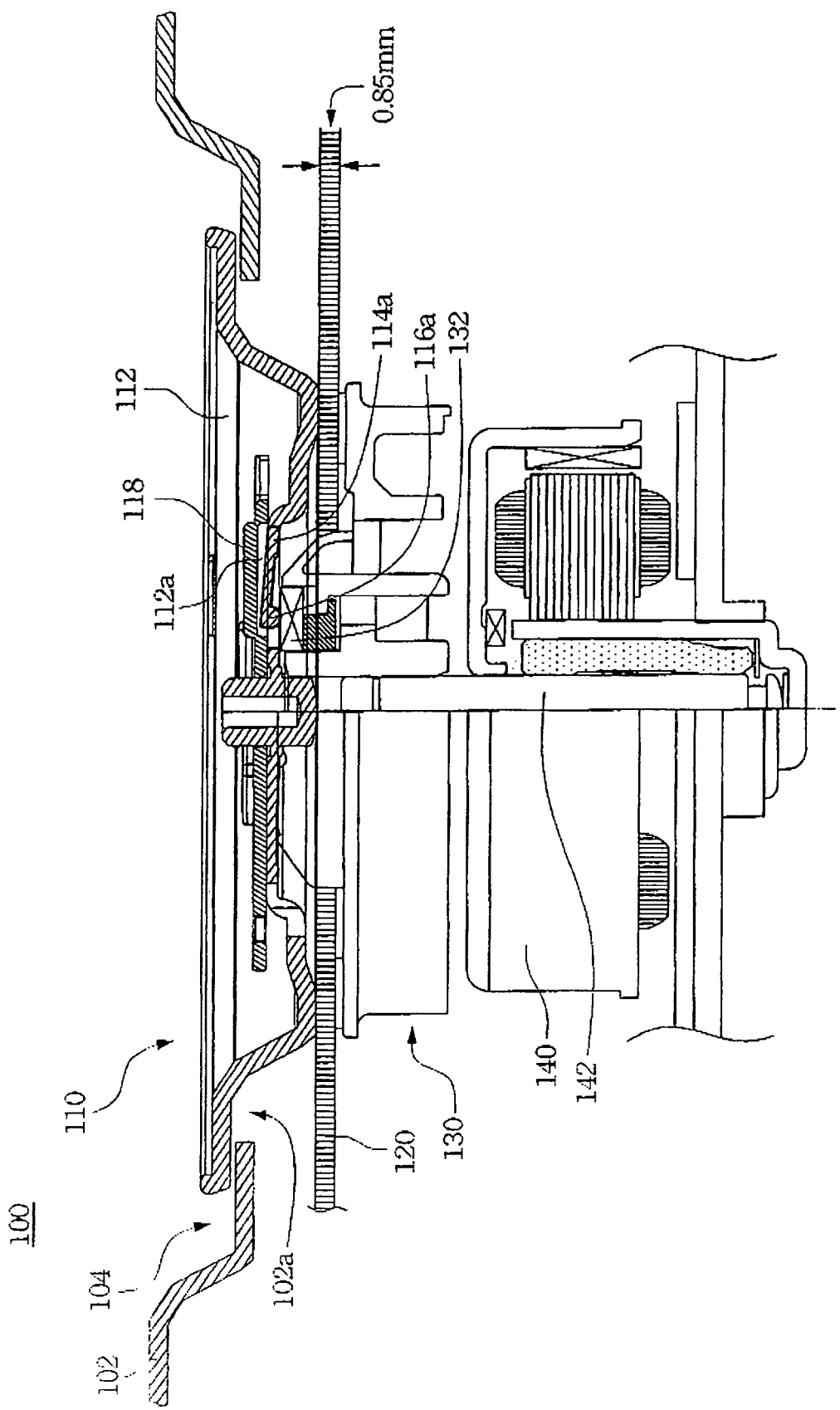
FIG. 3 illustrates a cross-sectional view of an optical disk drive (the disk inside is 0.85 mm in thickness) according to one preferred embodiment of this invention.

FIG. 3 illustrates a cross-sectional view of an optical disk drive (the disk inside is 0.85 mm in thickness) according to one preferred embodiment of this invention. When an optical storage media 120 (such as an optical storage media of 0.85 mm in thickness) is sandwiched and clamped between the turntable 130 and the clamper 110, a motor 140 rotates a combination of the turntable 130, the clamper 110 and the optical storage media 120 between thereof such that an optical pickup head can read from or write to the optical storage media 120.

FIG. 4 illustrates a cross-sectional view of an optical disk drive (the disk inside is 1.2 mm in thickness) according to one preferred embodiment of this invention. This preferred embodiment is almost the same as the former ones except that a thicker optical storage media 120 of about 1.2 mm in thickness is inserted in the optical disk drive 100. It has between noted from the above three preferred embodiments that the clamper 110 can either clamp the optical storage media 120 of varied thickness or no optical storage media, and still reduce noise generated by the impact between the turntable 130 and the clamper 110. It has been noted that, the noise can be reduced as much as 5.87 db by the resilient arms of the clamper.

According to the preferred embodiments, an optical disk drive of the present invention has a clamper with resilient arms so as to buffer the impact when a turntable hits a clamper due to magnetic forces, thereby reducing the noise thereof.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical disk drive for accessing an optical storage media, having a turntable utilized to place the optical storage media, the optical disk drive comprising:
    a housing having an opening; and
    a clamper disposed in the opening, the turntable in contact with the clamper at a first position, the turntable being separate from the clamper at a second position, the clamper comprising:
        a base portion, having at least one concave section located on the base portion, the concave section facing the turntable; and
        at least one resilient arm, connecting to the base portion, the resilient arm having a convex portion at one end, the convex portion facing the turntable and being positioned between the concave section and the turntable.

2. The optical disk drive of claim 1, wherein the convex portion is in contact with the turntable when the turntable is at the first position.

3. The optical disk drive of claim 1, wherein the base portion further comprises a first mutually-attracted device, and the concave section is positioned between the first mutually-attracted device and the convex portion.

4. The optical disk drive of claim 3, wherein the turntable further comprises a second mutually-attracted device, when the turntable carries the optical storage media and rises close to the first mutually-attracted device, the optical storage media is sandwiched between the first and second mutually-attracted device by magnetic forces thereof.

5. The optical disk drive of claim 4, wherein the first mutually-attracted device is made from iron, cobalt, nickel or alloy thereof, and the second mutually-attracted device is a magnet.

6. The optical disk drive of claim 4, wherein the second mutually-attracted device is made from iron, cobalt, nickel or an alloy thereof, and the first mutually-attracted device is a magnet.

7. The optical disk drive of claim 4, wherein the first and second mutually-attracted devices both are magnets.

8. The optical disk drive of claim 4, wherein the second mutually-attracted device is disposed inside the turntable.

9. The optical disk drive of claim 1, wherein the housing further comprises a concavity, the opening being positioned in the concavity, a first portion of the clamper being led through the opening and a second portion of the clamper being positioned on the concavity.

10. The optical disk drive of claim 1, further comprising a motor to rotate the turntable.

* * * * *